3,108,093
Patented Oct. 22, 1963

3,108,093
NEW CHEMICAL COMPOUNDS AND
USES THEREOF
Andrzej Pajaczkowski, Harpenden, England, and John Michael Turner, Beloeil Station, Quebec, Canada, assignors to Canadian Industries Limited, Quebec, Canada, a corporation of Canada, and Imperial Chemical Industries Limited, London, England, a corporation of Great Britain
No Drawing. Filed Jan. 8, 1960, Ser. No. 5,331
Claims priority, application Great Britain Jan. 16, 1959
9 Claims. (Cl. 260—89.5)

This invention relates to new peroxycarbonic esters able to function as free-radical-producing catalysts, or initiators, for addition-polymerization processes.

Peroxydicarbonic esters, monoperoxycarbonic esters and diperoxycarbonic esters having respectively the general formulae

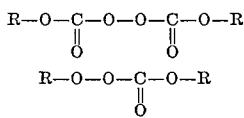

and

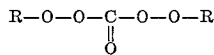

are known to the art and some of them, particularly peroxydicarbonic esters, have been employed as catalysts for the polymerization of vinyl esters and ethylene. Though possessing considerable usefulness for this purpose peroxydicarbonic esters suffer from certain restrictions inherent in their solubility and their specific thermal stability; they are too insoluble in mineral spirits and similar hydrocarbon solvents for safe handling in solution at low temperatures, and at higher temperatures at which they are soluble serious decomposition is liable to occur. We have now discovered a new class of peroxycarbonic esters which have improved solubility and do not through instability complicate the polymerizaiton processes they catalyse, and which further are effective in initiating useful rates of polymerization in certain temperature ranges not conveniently accessible by the use of known catalysts in a technical process.

According to our invention we provide as new compositions of matter acyl peroxycarbonic esters having the general formula

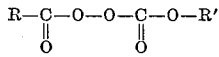

in which R and R' represent radicals selected from unsubstituted and substituted hydrocarbon residues.

The acyl peroxycarbonic esters may be prepared by reacting a peroxycarboxylic acid having the general formula

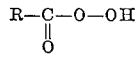

with a haloformate having the general formula

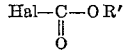

usually the chloroformate. The reaction is preferably carried out in the presence of a base, for example sodium hydroxide if the reaction is not required to be anhydrous, or pyridine.

According to a further feature of our invention, a process for the production of polymers comprises subjecting a compound containnig the group $>C=CH_2$ to polymerization conditions in the presence of a catalytic quantity of an acyl peroxycarbonic ester as described. Compounds that may be polymerized by this process include ethylene, styrene, methyl methacrylate, vinyl chloride, vinyl acetate and other vinyl esters and related compounds. The acyl peroxycarbonic esters are particularly useful as catalysts for the polymerization of ethylene.

Suitable peracids for use in the production of the esters of high catalytic activity include perlauric acid, perbenzoic acid, percaproic acid, per-2-ethylhexanoic acid, perpivalic acid. Suitable chloroformates include methyl, ethyl, isopropyl, t-butyl, amyl, cyclohexyl, and chloroalkyl chloroformates. The acyl peroxycarbonic esters preferred for use as ethylene polymerization catalysts are those in which the sum of the carbon atoms contained by the groups R and R' in the above formula is from 6 to 20. These groups may be unsubstituted hydrocarbon groups, or may contain substituents, particularly halogens, or hydrocarbon groups linked through ether oxygen. Particularly preferred esters are those in which R contains from 6 to 16 carbon atoms and R' from 1 to 8 carbon atoms.

In the polymeriztaion of ethylene using acylperoxycarbonic esters as catalysts, polymerization pressures are preferably above 500 atmospheres, usually between 1000 and 2000 atmospheres. The temperature of polymerization is above 10° C. and preferably between 50° C. and 200° C. For any particular catalyst, the temperature at which greatest efficiency is obtained depends upon the other conditions, and upon whether the process is a batch or continuous process; the optimum temperature for a continuous process will be higher than that for a batch process, other conditions being similar. The polymerization may be carried out, if desired, in the presence of an inert reaction medium such as benzene or petroleum ether. Chain-transfer agents may be added to the ethylene if desired. These include, for example: hydrogen, ethane, propane, cyclohexane and other saturated hydrocarbons; and chlorinated aliphatic hydrocarbons, such as carbon tetrachloride. Likewise antioxidants and other polymer-soluble additives may be introduced into the reaction environment.

Our invention is illustrated but in no way limited by the following examples, which describe the production of certain acylperoxycarbonic esters of this invention and their use as polymerization catalysts.

*Example 1*

To a mixture of 5.4 gm. perlauric acid, 2.4 gm. methyl chloroformate and 15 ml. dry ether, precooled to 0° C., were added 2.0 gm. pyridine so that the reaction temperature did not exceed 5° C. A further 25 ml. ether were added and the suspension was stirred for 1 hour, diluted with water and extracted with ether. The crude solid product was recrystallized three times from pentane at below —25° C. yielding lauroylperoxy methyl carbonate melting at 18° C. and decomposing with evolution of gas at 80° C. Its infra-red absorption spectrum (solution in pentane) showed intense C:O bands at 1818 and 1795 cm.$^{-1}$; no absorption was found at 1750 and 1706 cm.$^{-1}$, indicating the absence of perlauric and lauric acid respectively. *Analysis.*— found: C, 61.4%; H, 9.4%; active O, 5.6%. Calculated for $C_{14}H_{26}O_5$: C, 61.3%; H, 9.5%; active O, 5.8%.

0.25 ml. of a solution containing 5 gm. lauroylperoxy methyl carbonate per 100 ml. white spirit was placed in an 80 cc. stainless steel high pressure reaction vessel. The vessel was closed and the enclosed air swept out repeatedly with oxygen-free ethylene. The vessel was then charged with oxygen-free ethylene to a pressure of 1400 atmospheres and heated to 80° C. After an initial induction period, the pressure of the contents began to fall and was repeatedly brought back to 1400 atmospheres by the addition of fresh ethylene. When the cumulative pressure drop totalled 105 atmospheres the vessel was cooled, the pressure was released and the vessel was opened. It was found that 5.9 gm. of a white solid ethylene polymer had been produced.

*Example 2*

To a solution of 29 gm. of sodium perbenzoate in 100 ml. of water at 0° C. were added dropwise with stirring 25 gm. of isopropyl chloroformate; stirring was continued for 1½ hours, and the mixture was allowed to stand at 0° C. overnight.

The precipitate was dissolved in 50 ml. of chloroform and acid was removed by extraction with N/10 sodium hydroxide solution. After drying over anhydrous sodium sulphate the chloroform solution was stored for three days at −12° C. Crystals of benzoyl peroxide were removed by filtration and methanol was added to the filtrate to precipitate benzoylperoxy isopropyl carbonate, melting at 56–58° C. *Analysis.*—Found: C, 59.1%; H, 5.4%; active O, 7.0%. Calculated for $C_{14}H_{10}O_4$: C, 58.92%; H, 5.40%; active O, 7.13%.

*Example 3*

1.15 gm. isopropyl chloroformate, 2.0 gm. perlauric acid and 0.73 gm. pyridine were reacted in 7 ml. ether at 0° C. in a manner similar to that of Example 1. The ethereal solution was washed with water and dried and the product was isolated by crystallization and filtration at −70° C. The lauroylperoxy isopropyl carbonate melted at about 10° C. to a yellow oil, and decomposed with evolution of gas at 80–85° C. Dissolved in pentane, it showed strong infra red absorption bands at 1815 and 1787 cm.$^{-1}$; weak bands were observed at 1735 and 1707 cm.$^{-1}$. *Analysis.*—Found: C, 64.2%; H, 10.2%; active O, 3.5%. Calculated for $C_{16}H_{30}O_5$: C, 63.6%; H, 9.9%; active O, 5.3%. In a polymerization experiment similar to that described in Example 1, 0.25 ml. of a solution containing 5% lauroyl-peroxy isopropyl carbonate per 100 ml. pentane was used. The pressure applied was 1000 atmospheres and the temperature 80° C. 5.2 gm. ethylene polymer were produced.

*Example 4*

To a solution of 6.5 gm. of perlauric acid and 6.2 gm. of 3,5,5-trimethylhexyl chloroformate in 50 ml. of ether was added dropwise at 0° C. a solution of 2.4 gm. of pyridine in 10 ml. of ether. The mixture was stirred for three hours total, and 20 ml. of water were then added. The ether layer was separated and washed with both acid and alkali; after drying over anhydrous sodium sulphate, the solvent was removed in vacuo. The residual oil was cooled to −40° C. for twelve hours, and crystals of lauroyl peroxide (0.275 gm.) were removed by filtration. The residual lauroylperoxy 3,5,5-trimethylhexyl carbonate could not be crystallised, but its infra-red absorption spectrum in pentane solution exhibited bands at 1792 and 1818 cm.$^{-1}$, characteristic of the acylperoxy alkyl carbonates.

In a polymerization experiment similar to that described in Example 1, 0.25 ml. of a solution containing 5 gm. of lauroylperoxy 3,5,5-trimethylhexyl carbonate per 100 ml. of white spirit was used. The pressure applied was 1400 atmospheres, and the temperature 80° C. 5.9 gm. of ethylene polymer were formed.

*Example 5*

100 gm. of methyl methacrylate were mixed with 4 ml. of a solution containing 5 gm. of caprylylperoxy isopropyl carbonate per 100 ml. of white spirit, and heated at 50° C. in an atmosphere of nitrogen. After 16 hours the mixture had solidified to a colourless, vitreous polymer.

*Example 6*

100 gm. of styrene were mixed with 4 ml. of a solution containing 5 gm. of caprylylperoxy isopropyl carbonate per 100 ml. of white spirit and heated at 50° C. in an atmosphere of nitrogen for 16 hours. The mixture was then poured into 300 ml. of methanol and the solid precipitate was removed by filtration, washed with methanol and dried, to give 40 gm. of polystyrene.

We claim:

1. A process for the production of polymers that comprises subjecting a compound selected from the group consisting of ethylene, methyl methacrylate and styrene to polymerization conditions in the presence of a catalytic quantity of an acyl peroxycarbonic ester having the general formula

in which R is selected from the group consisting of alkyl and aryl radicals of 6 to 16 carbon atoms and R' is an alkyl radical of 1 to 8 carbon atoms.

2. A process for the polymerization of ethylene that comprises subjecting ethylene to a pressure above 500 atmospheres and a temperature above 10° C. in the presence of a catalytic quantity of a peroxycarbonic ester having the general formula

in which R is selected from the group consisting of alkyl and aryl radicals of 6 to 16 carbon atoms and R' is an alkyl radical of 1 to 8 carbon atoms.

3. A process as claimed in claim 2 in which the peroxycarbonic ester is lauroylperoxy methyl carbonate.

4. A process as claimed in claim 2 in which the peroxycarbonic ester is benzoylperoxy isopropyl carbonate.

5. A process as claimed in claim 2 in which the peroxycarbonic ester is lauroylperoxy isopropyl carbonate.

6. A process as claimed in claim 2 in which the peroxycarbonic ester is caprylylperoxy isopropyl carbonate.

7. A process as claimed in claim 2 in which the peroxycarbonic ester is lauroylperoxy 3,5,5-trimethylhexyl carbonate.

8. A process as claimed in claim 2 in which the polymerization pressure is between 1,000 and 2,000 atmospheres.

9. A process as claimed in claim 2 in which the polymerization temperature is between 50° and 200° C.

References Cited in the file of this patent

UNITED STATES PATENTS

| | | |
|---|---|---|
| 2,370,588 | Strain | Feb. 27, 1945 |
| 2,415,971 | Stevens | Feb. 18, 1947 |
| 2,566,537 | Schmerling | Sept. 4, 1951 |
| 2,646,425 | Barry | July 21, 1953 |
| 2,865,904 | Seed et al. | Dec. 23, 1958 |